Sept. 24, 1968 J. O. JONES 3,402,852
LIQUID MEASURING AND DISPENSING DEVICE
Filed March 3, 1967 3 Sheets-Sheet 1
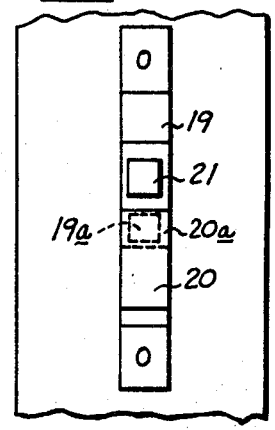
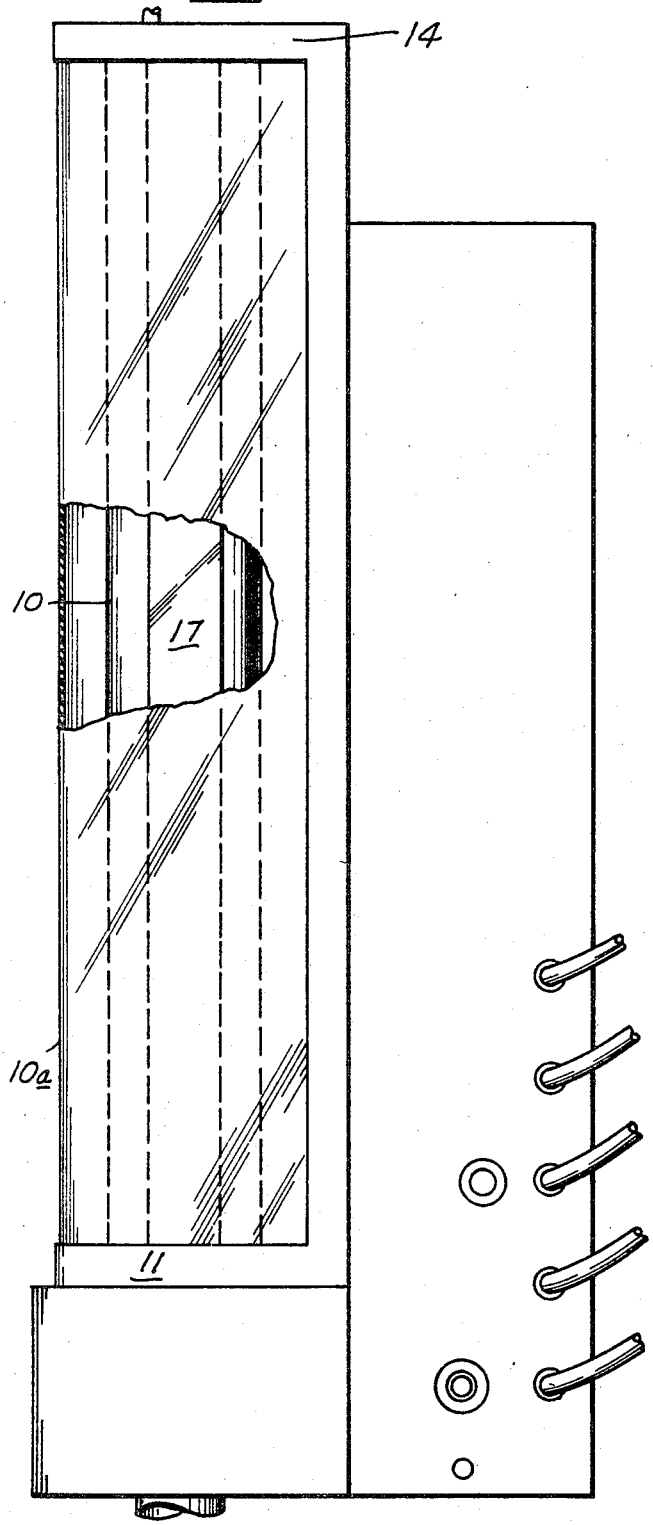
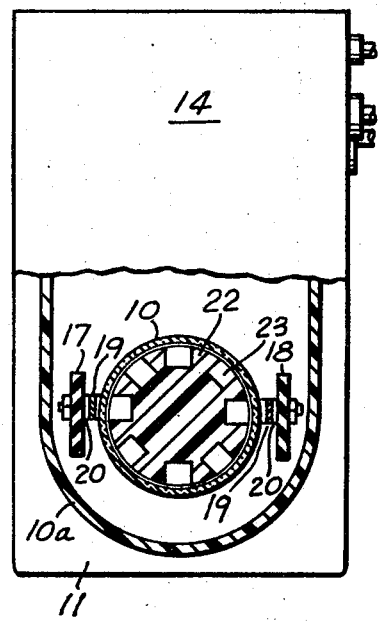
INVENTOR.
JAMES O. JONES
BY
ATTYS.

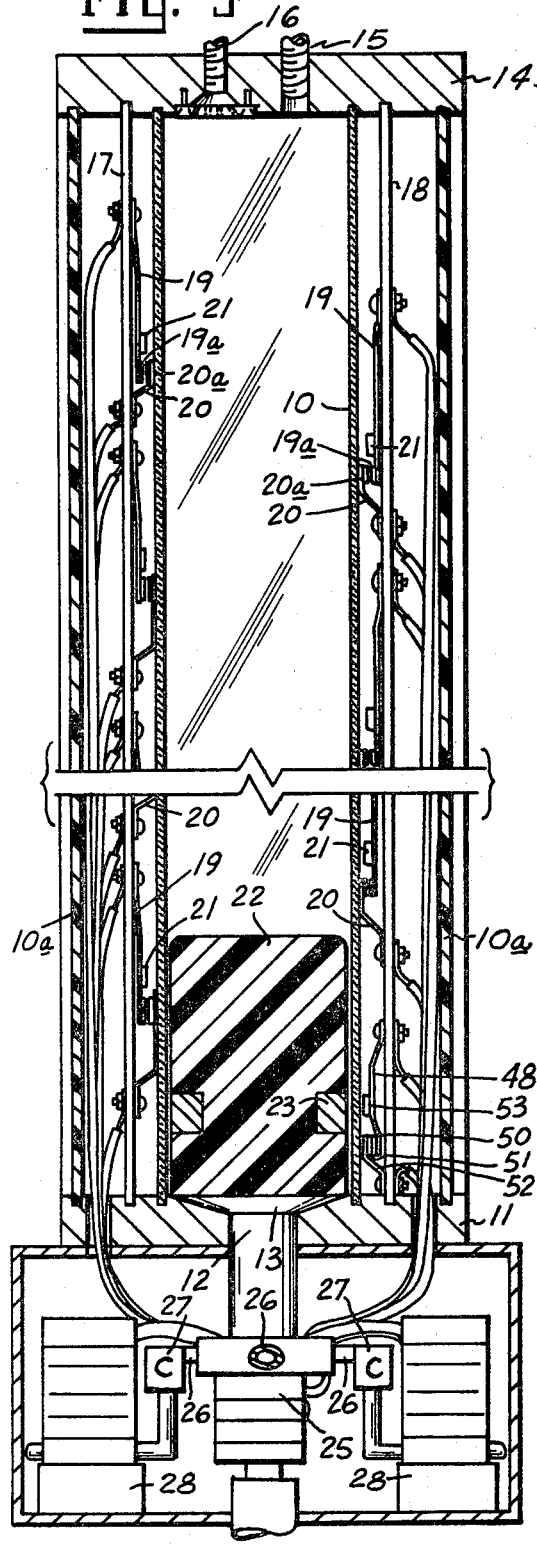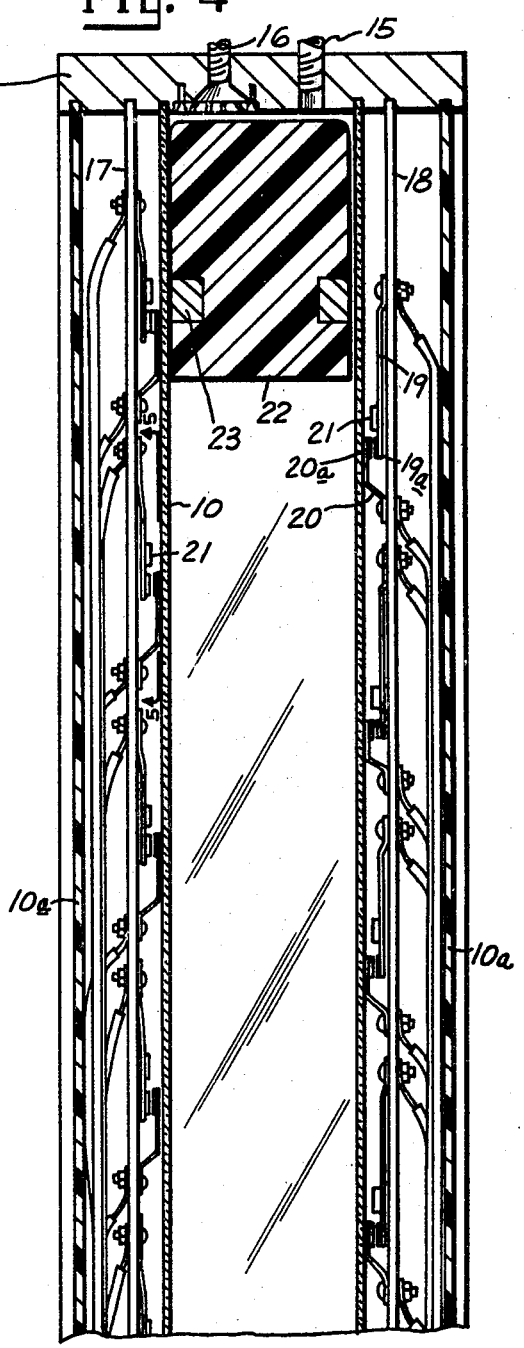

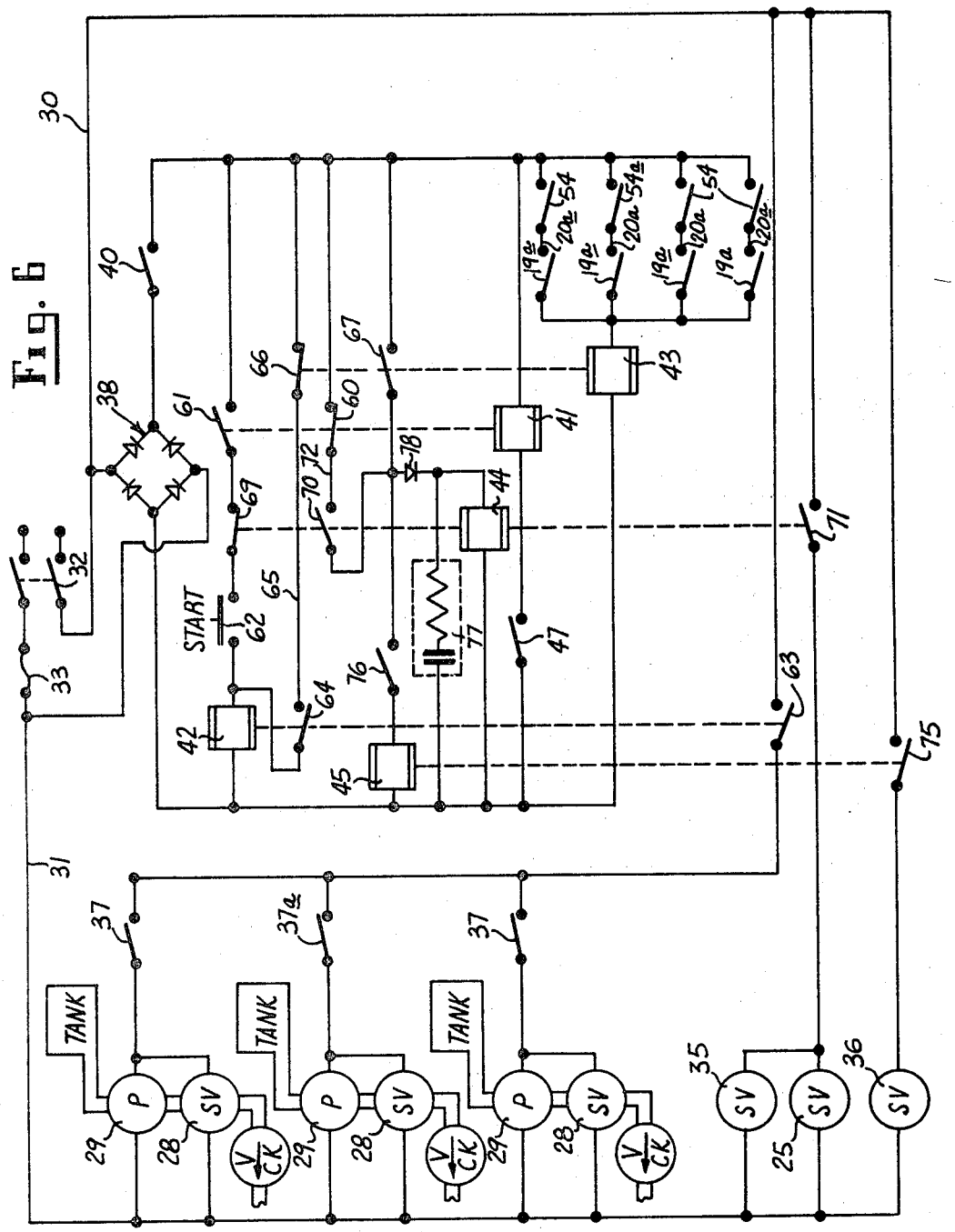

> United States Patent Office 3,402,852
Patented Sept. 24, 1968

3,402,852
**LIQUID MEASURING AND
DISPENSING DEVICE**
James O. Jones, Spokane, Wash., assignor to Central
Pre-Mix Concrete Co., Spokane, Wash.
Filed Mar. 3, 1967, Ser. No. 620,313
6 Claims. (Cl. 222—61)

ABSTRACT OF THE DISCLOSURE

The invention is a device for measuring liquids and for dispensing such liquids upon a given signal against a head of pressure if desired. The device is equipped to flush the measuring chamber with a rinsing liquid and to discharge the liquids with a blast of air or other gas at the completion of each dispensing cycle. In particular the invention provides a measuring tube with a float freely positioned therein which carries a magnet. Outside the tube a series of magnetically operable selector switches are arranged in vertically spaced relation. An electrical circuit including said switches is provided for operating valves at the bottom outlet of the tube and in the air inlet and the rinsing liquid inlets in a given sequence for a selected amount of liquid to be dispensed. The electrical circuit, during each cycle and after operation of the selector switch, causes the opening of the bottom outlet. Thereafter the introduction of a desired liquid to the tube, its discharge, the introduction of rinsing liquid and the introduction of air under pressure to flush out the tube follow in sequence to complete a cycle.

The device is particularly adapted to the supply of additive liquids to a batch of concrete being mixed. However, it is useful generally wherever it is desired to proportion out additive liquids into a mixing operation of batch type and where the liquids need to be varied either in kind or quantity or both.

Background of invention

The following prior United States patents are indicative of the various devices used for similar purposes to that of this invention: Gourdon, Patent No. 1,663,590; Witter, Patent No. 1,984,296; Lindars, Patent No. 2,755,966; Brobeil, Patent No. 2,774,364; Mitchell, Patent No. 2,804,091; Noall, Patent No. 2,905,361; and Cook, Patent No. 2,939,608.

Description of the invention

The invention is embodied in an apparatus as shown in the accompanying drawings wherein:

FIG. 1 is a view in side elevation of a housing in which the essential parts are housed;

FIG. 2 is a plan view of the housing with parts in section;

FIG. 3 is a sectional view taken vertically through the measuring and dispensing tube of the invention;

FIG. 4 is a view similar to FIG. 3 but showing the float element at the top limit of its travel;

FIG. 5 is a fragmentary side view taken at line 5—5 of FIG. 4, showing one of the switch elements;

FIG. 6 is a wiring diagram showing the electrical circuit of the device.

This device comprises a simple rugged dispenser that can be used for a variety of dispensing operations and that has the capacity adjustment to permit the operator to select any one of many specific quantities of liquid to dispense and to insure accurate measurement of the quantities. The device utilizes as the measuring and dispensing unit a transparent tube 10, which can be of glass as shown or of clear plastic. This tube 10 is sealed to a base 11 (FIG. 3) which has a liquid conduit 12 mounted therein and extending downwardly therefrom. The conduit 12 is flared as indicated at 13 to facilitate complete drainage of the measured liquid. The tube 10 is covered by a cap 14 which has inlets 15 and 16. Inlet 15 is for the blow down air or other gas and the inlet 16 is for a rinsing liquid. A cylindrical transparent plastic shield 10a is mounted concentrically about the tube 10 between the base 11 and the cap 14 for protecting the tube 10.

A pair of diametrically opposed contact mounting strips 17 and 18 are mounted concentrically between the tube 10 and the shield 10a extending from the base 11 to the cap 14. The strips 17 and 18, each carry several pairs of contact springs 19 and 20 which are so arranged that the springs 19 normally hold their contact points 19a away from the contact points 20a on the springs 20. Each of the springs 19 carries a magnetically attractable member 21 thereon facing the tube 10.

The vertical distance between the pairs of contacts is related to the liquid level increments for measuring the liquid. It should be appreciated that a plurality of strips may be positioned about the tube 10 with a plurality of contact pairs mounted thereon for measuring very small incremental changes in the level of the liquid. In addition the diameter of the tube 10 may be changed to give added versatility in the measuring capability of the device. To measure large volumes of liquids the device may be attached to the side of a vat or reservoir in much the same manner as a liquid level sight gauge.

A float 22 is freely positioned in the tube 10. The float 22 may be constructed of any suitable light weight material that is substantially impervious to the liquids to be measured. This float 22 fits loosely within the tube 10 so that it will be lifted by liquid flowing into the tube through the bottom conduit 12. The float 22 carries a ring of permanent magnet means 23 (FIG. 2) embedded therein so that as the float 22 moves up or down in the tube 10 a permanent magnet will be positioned to attract the members 21 on the springs 19. The magnetic attraction is sufficient to move the contact 19a on the spring 19 into engagement with the contact 20a on the spring 20 to provide electrical continuity in a control circuit.

A normally closed solenoid operated valve 25 is mounted beneath the base 11 to control the outflow of liquid from the conduit 12. Between the valve 25 and the tube 10, a plurality of liquid inlets 26 communicate with the conduit 12 to supply liquid into the tube 10. Each of the inlets 26 has a check valve 27 mounted therein which allows liquid to flow into the conduit 12 but prevents back flow from the conduit 12 past the check valve. Solenoid operated valves 28 control the flow of liquid supplied by pumps 29 from liquid supply tanks 29a (FIG. 6) to the inlets 26.

Referring now to FIG. 6 where the wiring diagram is shown for electrically controlling the operation of the device, an alternating current supply is provided over the lines 30–31. The line 30 is a common line and the line 31 leads from the power source through a main switch 32 and a fuse 33.

The AC lines 30 and 31 provide electrical power for opening the discharge solenoid valve 25 and an air solenoid valve 35 that are electrically connected in parallel. The air valve 35 controls the air flow through the inlet 15 and into the tube 10. The AC lines supply power to a rinse liquid solenoid valve 36 that controls the rinse liquid through the inlet 16 and into the tube 10. The AC lines also supply the power to the supply solenoid valves 28 and the pumps 29. The operator, in order to select the liquid which he desires to have measured, actuates a manual normally open switch 37 that corresponds to the specific solenoid valve 28 and pumps 29 associated with the tank 29a containing the desired liquid.

The electrical control circuits for controlling the desired sequence of operation are connected through a DC rectifier 38 to the AC lines. A manually operated DC main power switch 40 is placed in the control circuit downstream of the rectifier 38. Five relays 41, 42, 43, 44 and 45 are placed in parallel in the DC circuit for controlling the operation of the measuring and dispensing device. Relay 41 is associated with a lowermost magnetically operated switch which is specifically referred to as the low limit switch 47. The low limit switch 47 has a spring 48 with an electrical contact 50 affixed thereon for engaging an electrical contact 51 affixed to a spring 52 attached to the strip 18. A magnetic element 53 is mounted to the spring 48 for actuating the contacts 50 and 51.

Relay 42 principally controls the AC circuit for activating the selected inlet solenoid valve 28 and pump 29. Relay 43 is mainly associated with the magnetically operated contacts 19a and 20a that are connected in parallel for indicating the level of the liquid in the tube 10. Manually operated switches 54 are connected in series with the contacts 19a and 20a for selecting the desired liquid level. Relay 44 mainly controls the AC circuit for activating the discharge solenoid valve 25 and the air solenoid valve 35. Relay 45 controls the AC circuit for activating the rinse liquid solenoid valve 36.

The specific operation of the relays may be best understood when described in relation to a cycle of operation of the entire measuring and dispensing device. Initially it will be assumed that the tube 10 is empty and the float 22 is at the bottom. The magnet 23 attracts the magnetic element 53 to close the contacts 50 and 51 of the low limit switch 47. When the low limit switch 47 closes relay 41 is energized to open normally closed contacts 60 and close normally open contacts 61. Contacts 61 provide continuity to a start push button 62. Prior to pushing the start button 62, the operator selects the liquid he desires to have measured by closing one of the switches 37. He also selects the level of liquid that he wants measured by closing one of the switches 54. For purposes of illustration, it will be assumed that the operator closes switch 37a and switch 54a. The operator then initiates the automatic portion of the cycle by depressing the start button 62. The closing of start button 62 energizes relay 42 to close contacts 63 and 64. The closing of contacts 63 opens the selected solenoid valve 28 and starts the pump 29 to supply the desired liquid through the inlet 26 into the tube 10. As liquid begins to flow into the tube 10 the float begins to rise causing the low limit switch to open, thus de-energizing relay 41 and opening contacts 61 and closing contacts 60. In order to hold the relay 42 energized, the closing of contact 64 provides an alternate path through line 65.

When the level of the liquid in the tube 10 corresponds to the selected level expressed by the closed switch 54a, the magnet 23 causes the associated contacts 19a and 20a to close to energize relay 43. Relay 43 opens normally closed contacts 66 in line 65 and closes normally open contacts 67. The opening of contacts 66 de-energizes relay 42 to close the solenoid valve 28 and stop the pump 29, thereby terminating the flow of the liquid to the tube 10. The closing of contacts 67 energizes relays 44 and 45. Relay 44 in turn opens normally closed contacts 69, closes normally open contacts 70 and closes normally open contacts 71. The opening of contacts 69 inactivates the start button 62. The closing of contacts 71 opens the discharge valve 25 and the air valve 35 to allow the liquid to drain from the tube 10 assisted by the air emitted through inlet 15. In order to hold the relays 44 and 45 energized while the liquid is being dispensed, the closed contacts 70 provide an alternate path 72 for by-passing the relay 43. The relay 45, when energized, closes normally open contacts 75 to open the rinse solenoid valve 36 to allow rinse liquid into the tube 10. If it is desired not to use rinse liquid to flush the tube 10, the manual contacts 76 may be opened to keep the relay 45 de-energized.

As the liquid is dispensed from the tube 10, the contacts 19a and 20a open to de-energize relay 43. The de-energization of relay 43, closes contacts 66 and opens contacts 67. When the float 22 reaches the bottom of the tube, the low limit switch 47 is actuated to again energize relay 41. Relay 41 then opens contacts 60 to disrupt line 71 to begin de-energizing relays 44 and 45 to closing the discharge valve 25, the air solenoid valve 35, and the rinse solenoid valve 36. The relay 41 also closes contacts 61 in preparation for the next cycle.

In order to properly flush the tube 10, a time delay device 77, specifically an RC circuit, is placed in parallel with the relay 44 to keep the relay 44 energized after the float reaches the bottom and the rinse liquid valve 36 is closed. Specifically, the valves 25 and 35 are kept open after the rinse valve is closed. This time delay is sufficient to enable the air flush to remove any liquid from the tube 10. A diode 78 is placed in the circuit between the time delay device 77 and the relay 45 to prevent the continued energization of relay 45 once the relay 41 is energized.

At the termination of the time delay the relay 44 de-energizes to close the valves 25 and 35. The contacts 69 and 70 return to their original positions in preparation for the next cycle.

Before starting a new cycle the operator may select a different liquid by opening the switch 37a and closing another switch 37. He may also select a different volume by opening the switch 54a and closing another switch 54.

One of the uses of the measuring and dispensing device is in the preparation of concrete where accurate amounts of liquid concrete additive are added during the cement mixing operation. The liquid additives are measured and dispensed into the concrete mixer by the above described device. Generally water is used in rinsing the inside of the tube 10 as it does not adversely affect the process.

It is understood that the above described embodiment is simply illustrative of the principles of my invention. Numerous other embodiments can be readily devised by those skilled in the art which fall within the spirit and the scope of my invention. Therefore, only the following claims are intended to define my invention.

I claim:

1. A liquid measurer and dispenser comprising a measuring tube having a bottom passage through which the liquid enters and leaves the tube;
   a float in the tube for freely floating on top of the liquid, said float carrying a permanent magnet;
   a series of manually selectable switches actuable by said magnet and positioned outside of the tube in juxtaposition thereto and arranged in vertically spaced positions;
   a device for pumping liquid into the tube through said bottom passage;
   the switches being operably connected to the pumping device to cut off the pumping of liquid into the tube when the float carried magnet ascends to the level of a selected one of said switches;
   an outlet valve operable upon the actuation of a selected one of said switches to open a dispensing conduit to the bottom of said tube; and
   means to supply gas under pressure to said tube above the liquid to flow past the float and flush the liquid through said dispensing conduit.

2. The invention defined in claim 1 together with means actuated by closing of the selected switch to introduce a supply of rinsing liquid into the tube above the liquid to rinse the inside of the tube.

3. The invention defined in claim 1 wherein means are provided automatically to cut off the gas supply after the float reaches the bottom of the tube.

4. The invention defined in claim 1 wherein the dispensing conduit remains open to the tube when the float is at the bottom of the tube; and a time delay device is connected with the air supply to keep it open for a brief time after the float reaches the bottom of the tube to adequately flush the liquid from the tube.

5. A liquid measurer and dispenser as defined in claim 2 further comprising control means connected to the outlet valve, gas supply and rinsing liquid supply to keep the dispensing conduit and air supply open after the liquid and rinsing liquid are drained from the tube to flow air past the float and out the dispensing conduit to remove any remaining liquid from the tube.

6. A liquid measurer and dispenser as defined in claim 2 wherein the magnet of the float activates a low level switch when the float descends to the bottom of the tube to stop the flow of rinsing liquid into the tube.

References Cited

UNITED STATES PATENTS

| 2,847,196 | 8/1958 | Franklin et al. | 222—76 X |
| 3,114,478 | 12/1963 | Hilkemeier et al. | 222—76 X |
| 3,341,076 | 9/1967 | Wasilewski et al. | 222—76 |

ROBERT B. REEVES, *Primary Examiner.*

HADD S. LANE, *Assistant Examiner.*